3,093,631
NEW CYCLIC DIAMINES AND PROCESS FOR
THEIR MANUFACTURE
Cyril Grob and Oswald Schier, Basel, Switzerland, assignors to Ciba Corporation, a corporation of Delaware
No Drawing. Filed Apr. 29, 1959, Ser. No. 809,631
Claims priority, application Switzerland Apr. 30, 1958
20 Claims. (Cl. 260—239)

This invention provides N-substituted 1:5-diazo-cyclooctanes, and salts, quaternary ammonium compounds and N-oxides thereof, and especially compounds of the general formula

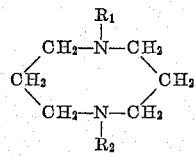

in which $R_1$ represents an organic radical capable of being introduced into a tertiary amine by quaternization, and $R_2$ represents hydrogen or an organic radical, and salts, quaternary ammonium compounds and N-oxides thereof. Organic radicals capable of being introduced into a tertiary amine by quaternization and organic radicals represented by $R_2$ are, for example, hydrocarbon radicals, such as, more especially, alkyl groups with 1 to 22, but preferably 1 to 12 carbon atoms, for example, methyl, ethyl, propyl, isopropyl, butyl, isobutyl, pentyl, hexyl, lauryl; aralkyl radicals such as benzyl and diphenyl-methyl radicals of which the aromatic part may be further substituted, or hydrocarbon radicals containing substitutents, such as hydroxyl, alkoxy or aryloxy groups, halogens and free or substituted amino groups, for example hydroxyalkyl radicals such as the β-hydroxyethyl radical, β-hydroxypropyl radical, γ-hydroxypropyl radical or δ-hydroxybutyl radical, alkoxyalkyl radicals such as the γ-acetoxy-propyl radical, free or further substituted aryloxy radicals such as the γ-phenoxypropyl radical, halogenated alkyl radicals such as the γ-bromopropyl radical, or alkyl radicals which bear a free or substituted amino group, such as the γ-diethylaminopropyl radical. An organic radical represented by $R_2$ is also an acyl radical, for example the acetyl radical.

These compounds are obtained by quaternating a 1:2-trimethylene-pyrazolidine, treating the quaternary ammonium compound so obtained with a reducing agent, and, if desired, introducing a further substituent into the 5-position of the 1-substituted 1:5-diazo-cyclooctane so obtained and/or converting any functional groups present in the substituents introduced at the nitrogen atoms and/or converting a compound so obtained into a salt, quaternary ammonium compound or N-oxide thereof.

The sequence of reactions may be represented by the following formulae.

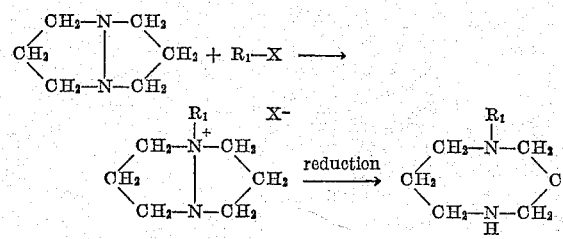

in which $R_1$ has the meaning given above, and X represents a reactive ester group.

The process is new and gives good yields. It is surprising and could not be expected in any way that quaternary 1:2-trimethylene-pyrazolidinium compounds could be converted smoothly into 1:5-diaza-cyclooctane derivatives which contain an 8-membered ring system having a high ring strain.

The 1:5-diaza-cyclooctanes have a ring system homologous with that of piperazine. Piperazine derivatives possess a wide range of biological activities and have found application in medicinal chemistry in many preparations. The new 1:5-diaza-cyclooctanes are also pharmacologically active. Thus, compounds which contain in 1-position a lower alkyl radical containing a free or substituted hydroxy or amino group or a halogen atom, such as 1-(γ-phenoxypropyl)-1:5-diaza-cyclooctane dihydrobromide and 1-(γ-hydroxy-propyl)-1:5-diaza-cyclooctane dihydrobromide inhibit intraspinal reflex transmission and are useful as medicaments for the treatment of certain neurological diseases, more especially those associated with enhanced spasticity. The 1:5-diazo-cyclooctane and quaternary 1:2-trimethylene-pyrazolidinium salts having long-chain hydrocarbon radicals in 1-position are useful as medicaments or as disinfectants, for example, as pest-combating agents, or in the case of pyrazolidinium salts as intermediate products for the manufacture of the foregoing cyclooctane compounds.

1:2-trimethylene-pyrazolidines can be quaternated, for example, by reaction with a reactive ester of an alcohol of the general formula $R_1$—X in which $R_1$ has the meaning given above, and X represents a reactive ester group, advantageously a halogen atom, a hydroxyl group esterified with a sulfonic acid or a sulfate radical. The reaction may be carried out in the presence or absence of a solvent, but advantageously in an anhydrous organic solvent, for example, in absolute acetone.

As a reducing agent for converting the 1-substituted 1:2-trimethylene-pyrazolidinium salt into a 1-substituted 1:5-diaza-cyclooctane there is advantageously used nascent hydrogen, for example, which may be liberated by a metal, which may be activated, and water, an aqueous acid or an organic solvent containing hydroxyl, or hydrogen which is liberated under suitable conditions from simple or complex metal hydrides, such as lithium aluminum hydride. It is of advantage to use amalgamated aluminum in the presence of water.

The 1-substituted 1:5-diaza-cyclooctane so obtained, may, if desired, be treated to introduce a secondary amine as a further substituent into the 5-position by a method in itself known. For example, a radical $R_2$ as defined above may be introduced by alkylation, aralkylation or acylation.

Functional groups in the substituents introduced at the nitrogen atoms, can, if desired, be functionally converted. For example, a free or substituted hydroxyl group can be converted into a reactive ester group, preferably a halogen atom, such as bromine, or a hydroxyl group esterified with a sulfonic acid or a sulfate radical, by treatment with a strong acid, for example, hydrobromic acid, or with a reatcive derivative of a strong acid such as an anhydride or an acid halide. This reactive ester group can then be used for further reactions, for example be replaced by an alkoxy group, a free or substituted amino group or a hydrazine group.

From the 1-substituted or 1:5-disubstituted 1:5-diaza-cyclooctane salts, quaternary ammonium compounds or N-oxides may be made in the usual manner. Depending on the reaction conditions used and on the substituents present, salt formation or quaternation takes place at one or both of the nitrogen atoms in the ring. From bis-salts the mono-salts can be obtained by methods in themselves known. From mono-salts and mono-quaternated compounds having the 1:5-diaza-cycloctane structure there may be made, if desired, mixed bis-salts, mixed bis-quaternated compounds or salts of quaternated compounds.

If desired, the free bases may be prepared from the salts.

Suitable for quaternization are, for example, reactive esters of alcohols, the reactive ester group being preferably a halogen atom, a hydroxyl group esterified with a sulfonic acid or a sulfate radical. Particularly suitable are reactive esters of alkanols, such as alkyl halides, more especially methyl or ethyl bromide. The substituent bearing the reactive ester group can be already bound to the 1:5-diazacyclo-octane system. Thus, for example, N-(γ-bromopropyl)-1:5-diazacyclo-octane can be quaternated to form N-trimethylene-1:5-diazacyclo-octanonium bromide. N-oxide compounds are obtained in the customary manner by oxidation of the corresponding tertiary amino groups, particularly by treatment with hydrogen peroxide or in an aqueous alcohol.

The 1:2-trimethylene-pyrazolidines used as starting materials are either known or can be made by methods in themselves known. There are advantageously used starting materials that lead to those compounds which are mentioned above as being especially valuable.

The reactions are carried out by methods in themselves known in the presence or absence of a diluent and/or a condensing agent and/or a catalyst, at the ordinary or a raised temperature under atmospheric or superatmospheric pressure.

The invention also includes any modification in which there is used as starting material a compound obtainable as an intermediate product at any stage of the process and the remaining steps of the process are carried out, or in which the process is interrupted at any stage.

When the new compounds are to be used as medicaments they may be used in the form of pharmaceutical preparations which contain the compound in admixture with a pharmaceutical organic or inorganic carrier suitable for enteral, parenteral or topical administration. For making the carriers there are used substances that do not react with the new compounds, for example, water, gelatine, lactose, starches magnesium stearate, talc, vegetable oils, benzyl alcohols, gums, polyalkylene glycols, white petroleum jelly, cholesterol or other known carrier for medicaments. The pharmaceutical preparations may be in the form, for example, of tablets, dragees, salves, creams, or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances. The preparations can be made up by the usual methods.

The following examples illustrate the invention:

*Example 1*

2.24 grams of 1:2-trimethylene-pyrazolidine boiling at 168–169.5° C. (0.02 mol) are heated with a slight excess of ethyl bromide (boiling at 38° C.) in 100 cc. of absolute acetone (dried over "Sikkon") under reflux for 3 hours. The whole is then allowed to cool overnight to —10° C., the acetone is decanted from the well crystallized colorless 1-ethyl-1:2-trimethylene-pyrazolidinium bromide of the formula

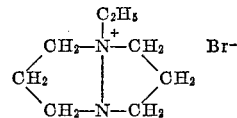

and the latter product is extracted twice with a small amount of absolute acetone and dried in a water jet vacuum.

For the purpose of reduction 4 grams of sorted clean aluminum shavings are defatted according to Vogel and amalgamated (J. Chem. Soc. 597 (1927)). The activated aluminum is covered with 80 cc. of ether, the crude 1-ethyl-1:2-trimethylene-pyrazolidinium bromide is added, and then 10 cc. of water are added in portions while cooling with ice, and the whole is allowed to stand overnight at 0° C. An excess of solid potassium hydroxide is added to the reaction mixture, and the later is exhaustively extracted with ether. The resulting crude 1-ethyl-1:5-diaza-cyclooctane of the formula

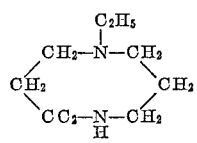

is dissolved in 40 cc. of isopropanol, then cooled in a mixture of ice and sodium chloride, and to the solution are added 3.7 cc. of hydrobromic acid of 48% strength (dissolved in 10 cc. of isopropanol). 4.3 grams of the dihydrobromide melting at 209–211° C. crystallizes out (yield 71%). After recrystallization from ethyl alcohol the melting point of the product rises to 211–213° C. (with decomposition).

*Example 2*

An excess of methyl bromide (15 cc.) is cautiously added to a solution of 10.01 grams (0.89 cc.) of 1:2-trimethylene-pyrazolidine in 200 cc. of absolute acetone, while cooling with ice. After allowing the reaction mixture to stand for some time at room temperature, it is cooled to —12° C., and the well crystallized hygroscopic methyl-1:2-trimethylene-pyrazolidinium bromide of the formula

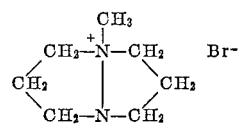

is filtered off rapidly, and given a short washing with absolute acetone. After drying the product in a water jet vacuum, there are obtained 16 grams of (87%) of colorless crystals melting at 264–267° C.

The aluminum amalgam reduction is carried out as described in Example 1. The crude 1-methyl-1:5-diazacyclooctanol of the formula

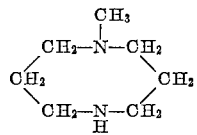

obtained by working up, boils under atmospheric pressure at 175–176° C., and yields from isopropanol with the addition of hydrobromic acid of 48% strength a dihydrobromide melting at 215–217° C., which can be recrystallized from ethyl alcohol.

*Example 3*

2.24 grams of 1:2-trimethylene-pyrazolidine (0.02 mol) boiling at 169–171° C. are heated with 2.78 grams of trimethylene bromohydrin (0.02 mol) in 100 cc. of absolute acetone for 2½ hours under reflux. After cooling the mixture to —10° C., the solvent is decanted off and the resulting 1-(γ-hydroxy-propyl)-1:2-trimethylene-pyrazolidinium bromide of the formula

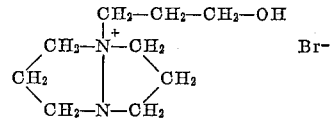

is extracted three times with 20 cc. of absolute acetone each time; melting point=92–93° C.

4 grams of aluminum shavings that have been defatted and activated are used for the reduction. The crude crystalline bromide is added first and then 10 cc. of water in portions to the aluminum covered with 80 cc. of ether, and the whole is allowed to stand overnight at 0° C. In order to isolate the base so formed an excess of solid potassium hydroxide is added to the reaction mixture, while cooling, and the mixture is then exhaustively extracted with ether. There are obtained 2.85 grams of crude 1-(γ-hydroxy-propyl)-1:5-diaza-cyclooctane of the formula

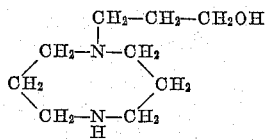

The latter product is dissolved in 40 cc. of isopropanol, and 3.9 cc. of hydrobromic acid of 48% strength (dissolved in 10 cc. of isopropanol) are added while cooling with a mixture of ice and sodium chloride. The dihydrobromide, which precipitates initially in an oily form, crystallizes immediately upon light scratching. The precipitate is filtered off, and after drying it, there are obtained 4.96 grams of crystals melting at 199–201° C. with decomposition. The yield is 74%. By recrystallization the melting point of the product is raised to 203–204° C.

*Example 4*

10.68 grams (0.095 mol) of 1:2-trimethylene-pyrazolidine boiling at 169–170° C. are heated with 20.41 grams (0.095 mol) of γ-phenoxypropyl bromide (boiling at 131–134° C. under 14 mm. pressure) in 500 ml. of absolute acetone for 4 hours under reflux with the exclusion of moisture. After inoculating the solution, crystalline (γ-phenoxypropyl)-1:2-trimethylene-pyrazolidinium bromide begins to separate out a short time after the heating up. The reaction solution is maintained at −12° C. overnight, and, after decanting off the solvent, the colorless product is extracted three times with 20 cc. of absolute acetone each time. The very hygroscopic product is then dried for a few hours at 80° C. under an ordinary vacuum and subsequently under a high vacuum to remove the last traces of acetone and moisture. The yield is 26.5 grams (85%) of colorless (γ-phenoxy-propyl)-1:2-trimethylene-pyrazolidinium bromide of the formula

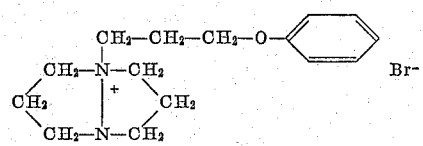

which melts at 141–142° C. and can be recrystallized from methyl ethyl ketone with the addition of isopropanol.

For the purpose of reducing 22 grams of the latter compound, 12.5 grams of bright aluminum shavings are cleaned and amalgamated. The activated aluminum is covered with 250 ml. of ether and, after the addition of the quaternary bromide, the whole is cooled with ice. There are then added in small portions 25 cc. of water with occasional agitation, and then the reaction mixture is allowed to stand overnight in ice. In order to extract the base so formed, there are first added 20 cc. of caustic potash solution of 50% strength and then an excess of solid potassium hydroxide. By extracting the mixture four times with about 200 cc. of ether each time there are obtained 15.5 grams of crude 1-(γ-phenoxy-propyl)-1:5-diaza-cyclooctane of the formula

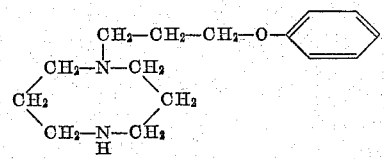

The latter compound is dissolved in about 100 cc. of ethyl alcohol and a solution of 14.6 cc. of hydrobromic acid of 48% strength in 10 cc. of ethyl alcohol is added while cooling with a mixture of ice and sodium chloride. The product is allowed to crystallize out in the cold, and is then filtered off and dried in a vacuum desiccator, whereby there are obtained 23.4 grams (85%) of the dihydrobromide in the form of colorless plates melting at 205–207° C., which can be recrystallized from ethyl alcohol.

*Example 5*

8.85 grams (0.027 mol) of (γ-phenoxypropyl)-1:2-trimethylene-pyrazolidinium bromide are boiled for 24 hours under reflux with 1.62 grams of lithium aluminum hydride in 80 cc. of absolute tetrahydrofurane. After cooling the mixture in ice, the excess of lithium aluminum hydride is decomposed by adding moist ether, and an excess of solid potassium hydroxide is added to the reaction mixture. Exhaustive extraction with ether yields 6.2 grams of the colorless crude base, which is then dissolved in 80 cc. of ethyl alcohol and, after cooling the mixture with ice and sodium chloride, 6 cc. of hydrobromic acid of 48% strength (dissolved in 10 cc. of ethyl alcohol) are added. Upon cooling to −12° C. 1.2 grams of (γ-phenoxy-propyl)-1:5-diaza-cyclooctane dihydrobromide crystallize out. According to its melting point and the mixed melting point with the product of Example 4, the product of this example is identical with the product of Example 4.

*Example 6*

11.2 grams (0.1 mol) of 1:2-trimethylene-pyrazolidine are dissolved in 100 cc. of absolute acetone and, after adding 12.5 grams (0.1 mol) of ethylene bromohydrin, the whole is boiled under reflux for 3 hours. The reaction solution is allowed to stand overnight in a refrigerator, the formed 1-(β-hydroxyethyl)-1:2-trimethylene-pyrazolidinium bromide of the formula

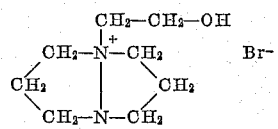

crystallizing out. The solvent is then poured off from the crystalline residue and replaced by 100 cc. of absolute ether. 6.5 grams of activated aluminum shavings together with 75 cc. of ether are added. 25 cc. of water are added dropwise with shaking and ice-cooling, and the whole is allowed to stand for 10 hours at 0° C. Potassium hydroxide is then added with cooling until the aqueous layer is a thick magma, and exhaustive extraction is then carried out with ether. The ethereal extract is dried, the ether evaporated and the residue, a yellow oil, distilled in vacuo. There is obtained 10.4 grams (66%) of 1-β-hydroxyethyl-1:5-diazacyclo-octane, melting at 137–139° C. under 14 mm. of pressure of formula

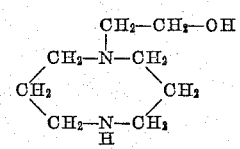

The resulting free base is dissolved in isopropanol and, by adding hydrobromic acid of 48% strength, is converted into the dihydrobromide. There is thus obtained 1-β-hydroxyethyl - 1:5 - diazacyclo-octane-dihydrobromide in the form of a monohydrate melting at 138–140° C.

*Example 7*

12.5 grams of (0.05 mol) of lauryl bromide are added to 5.6 grams (0.05 mol) of 1:2-trimethylene-pyrazolidine in 100 cc. of absolute acetone and the whole is boiled under reflux for 8 hours. The reaction mixture is allowed to stand overnight in the refrigerator, 1-lauryl-1:2-trimethylene-pyrazolidinium bromide of the formula

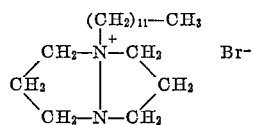

crystallizing out. The acetone is decanted off from the crystalline residue and replaced by 50 cc. of absolute ether.

Reduction with activated aluminum and working up is carried out in an analogous manner to that described in Example 6. After recrystallization from alcohol there are obtained 11 grams of 1-lauryl-1:5-diazacyclo-octane-dihydrobromide of the formula

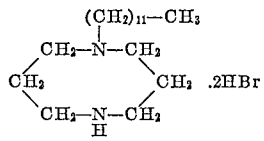

melting at 226–228° C. with decomposition.

*Example 8*

5.6 grams (0.05 mol) of 1:2-trimethylene-pyrazolidine are boiled under reflux in 50 cc. of absolute acetone with 6.5 grams (0.06 mol) of tetramethylene chlorhydrin for 5 hours. On allowing the mixture to stand at —10° C. there is obtained 1-(4'-hydroxybutyl)-1:2-trimethylene-pyrazolidinium chloride of the formula

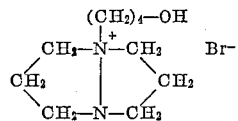

as yellow, non-crystallizing syrup. Reduction with activated aluminum and working up are carried out as described in Example 6. There are obtained 9 grams (52% yield) of 1-(4'-hydroxy-butyl) - 1:5 - diazacyclo-octane-dihydrobromide of the formula

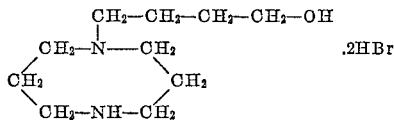

melting at 166–168° C.

*Example 9*

25 grams of 1-γ-hydroxy-propyl-1:5-diazacyclo-octane-dihydrobromide prepared according to Example 3 are heated with 400 cc. of hydrobromic acid of 48% strength at the boil. After evaporation 200 cc., the remaining solution is boiled under reflux for 8 hours, and then evaporated to dryness under reduced pressure (bath temperature up to 80° C.). On grinding with acetone, crystals are obtained. After filtering with suction and drying, there are obtained 28.5 grams of 1-γ-brompropyl-1:5-diazacyclo-octane-dihydrobromide of the formula

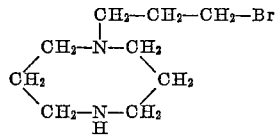

melting at 216–218° C. with decomposition.

*Example 10*

2.22 grams of N-(γ-phenoxypropyl)-1:5-diazacyclo-octane-dihydrobromide (Example 4) are heated in a bomb tube with 22 cc. of hydrobromic acid of 66% strength for 3½ hours at 120° C. After cooling and evaporating under reduced pressure there are obtained 2.20 grams of crystals. The latter are dissolved in 1.5 cc. of hydrobromic acid of 48% strength, 20 cc. of alcohol are added to the solution and then a little animal charcoal, and the whole is immediately filtered through Celite. On cooling, crystallization takes place and 2.03 grams of N-(γ-brompropyl)-1:5-diazacyclo-octane-dihydrobromide are obtained as colorless crystals; the product is identical with the compound obtained in Example 9.

*Example 11*

3.176 grams of N-(γ-bromopropyl)-1:5-diazacyclo-octane-dihydrobromide prepared as described in Example 9 or 10 are dissolved in 2 liters of 0.016 N-sodium hydroxide solution and allowed to stand for 2½ hours at room temperature. The solution is then neutralized by adding 25 cc. of hydrobromic acid (pH=5) and then evaporated to dryness in a water jet vacuum at 50–60° C. 6.5 grams of a colorless crystalline residue are obtained. The latter is dissolved in 20 cc. of water and agitated with an excess of freshly precipitated silver chloride for 2½ hours. The mixture is suction-filtered, the filtrate evaporated to dryness under reduced pressure and the crystalline residue extracted 3 times with 100 cc. of absolute alcohol each time. The residue is recrystallized a few times from a mixture of alcohol and ether, and N-trimethylene-1:5-diazacyclo-octanenium bromide of the formula

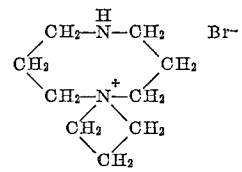

melting at 170–175° C. is obtained.

*Example 12*

8 grams (0.02 mol) of 1-γ-brompropyl-1:5-diazacyclo-octane-dihydrobromide prepared as described in Example 9 or 10 are added in portions to 110 grams (1.5 mol) of anhydrous diethylamine, and the reaction mixture is heated under reflux for 10 hours with stirring. Excess diethylamine is then distilled off, potassium hydroxide solution is added to the residue, the latter is extracted with ether, the ether extract dried and the ether evaporated. The residue is distilled under 14 mm. of pressure and yields 1-γ-diethylaminopropyl-1:5-diazacyclo-octane of the formula

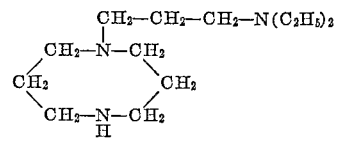

as main fraction boiling at 166–169° C. The distillate dissolved in isopropanol yields, after the addition of hydrobromic acid, 5 grams of 1-γ-diethylaminopropyl-1:5-diazacyclo-octane-trihydrobromide melting at 226–228° C. with decomposition.

*Example 13*

8 grams of (0.02 mol) 1-γ-bromopropyl-1:5-diazacyclo-octane-dihydrobromide (Example 9 or 10) are added in portions to a boiling solution of 5 grams of sodium in 150 cc. of absolute ethyl alcohol and, when the addition is complete, the whole is boiled under reflux for 2 hours. The filtered reaction solution is acidified (hydrochloric acid) and evaporated to dryness under reduced pressure. The residue to which potassium hydroxide solution is added yields an ethereal extract which on being distilled gives 1-γ-ethoxypropyl-1:5-diazacyclo-octane of the formula

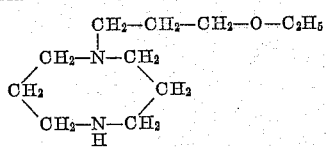

as main fraction boiling at 134–136° C. under 14 mm. of pressure. The distillate dissolved in isopropanol yields on addition of hydrobromic acid and after recrystallization from ethyl alcohol, 6.4 grams of 1-γ-ethoxypropyl-1:5-diazacyclo-octane-dihydrobromide melting at 204–205° C. with decomposition.

*Example 14*

2.6 grams (0.02 mol) of 1-methyldiaza-cyclooctane (Example 2) dissolved in 50 cc. of toluene, are heated under reflux with 4 grams of sodium carbonate and 0.5 gram of sodium iodide with stirring. In the course of 1 hour a solution of 5 grams (0.02 mol) of benzhydryl bromide in 50 cc. of toluene is added dropwise. The whole is then stirred under reflux for 8 hours and filtered while hot. By distilling in a water jet vacuum, solvent and unreacted 1-methyl-diazacyclo-octane are removed. The residue is subjected to a high vacuum sublimation at 0.01 mm. of pressure and a bath temperature of 210° C. There is obtained crude 1-methyl-5-benzhydryl-1:5-diazacyclo-octane of the formula

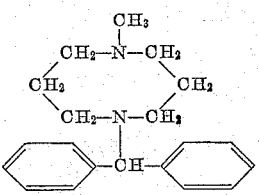

as a yellow oil partially mixed with crystals. The oil is boiled with 50 cc. of isopropanol, filtered off from any undissolved neutral substance and the filtrate acidified with hydrobromic acid. After adding the same volume of ether, the product is allowed to crystallize at −10° C. After recrystallization from aqueous alcohol there are obtained 3.1 grams (34% yield) of 1-methyl-5-benzhydryl-1:5-diazacyclo-octane-dihydrobromide melting at 212–214° C.

*Example 15*

2.6 grams (0.02 mol) of 1-methyl-1:5-diazacyclo-octane (Example 2) are boiled under reflux with 11.6 grams (0.2 mol) of propylene oxide for 40 hours. The mixture is then evaporated under reduced pressure at a bath temperature up to 70° C., and the resulting residue taken up in isopropanol (20 cc.). The reaction mass is acidified with hydrobromic acid, and ether is added until a faint turbidity sets in. The substance crystallizes in the refrigerator. By evaporating the mother liquor and grinding with ether, more crystals are obtained. After recrystallization from ethyl alcohol there are obtained 5.2 grams (74% yield) of 1-methyl-5-β-hydroxypropyl-1:5-diazacyclo-octane-dihydrobromide melting at 160–161° C. with decomposition of the formula

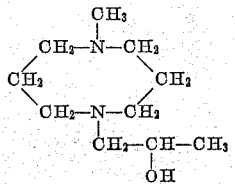

*Example 16*

2.6 grams (0.02 mol) of 1-methyl-1:5-diazacyclo-octane (Example 2) are dissolved in 100 cc. of methanol and boiled with 4.2 grams (0.03 mol) of trimethylene-bromhydrin for 5 hours under reflux. After cooling, the mixture is acidified with hydrochloric acid and evaporated under reduced pressure at a bath temperature of 50° C. Potassium hydroxide solution is added to the residue and extraction is carried out with ether, the ethereal extract is dried, evaporated and the residue distilled under reduced pressure. There is obtained 1-methyl-5-γ-hydroxypropyl-1:5-diazacyclo-octane of the formula

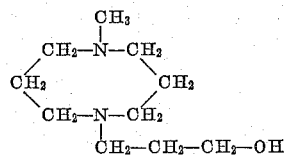

as a yellow oil boiling at 135–137° C. under 14 mm. of pressure.

After being taken up in isopropanol and precipitated with hydrobromic acid, 5 grams (72 yield) of the dihydrobromide melting at 188–190° C. with decomposition are obtained.

*Example 17*

1.99 grams of N-ethyl-1:5-diazacyclo-octane (Example 1) are dissolved in a little benzene; while cooling 5 cc. of acetic anhydride are added. After allowing the whole to stand for several hours at room temperature, the reaction mixture is heated for one hour at 100° C. and then evaporated under reduced pressure. The oily residue is dissolved in a little water and, while cooling in a mixture of ice and sodium chloride, an excess of potassium hydroxide is added. After extracting with ether and evaporating the solvent, there is obtained crude N-ethyl-N'-acetyl-1:5-diazacyclo-octane of the formula

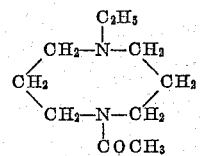

in the form of a colorless oil.

After being dissolved in ether and allowed to stand for 2 days with an excess of ethyl bromide, 1.25 grams of crystalline NN-diethyl-N'-acetyl-1:5-diazacyclo-octanonium bromide of the formula

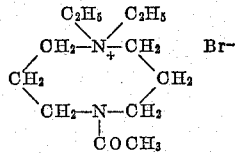

melting at 218–219° C. are obtained. After recrystallization from a mixture of isopropanol and acetone the melting point rises to 222–223° C.

*Example 18*

13 grams of γ-phenoxypropyl-1:5-diaza-cyclo-octane (Example 4) are allowed to stand for some hours at room temperature in a mixture of 25 cc. of benzene and 25 cc. of acetic anhydride. After heating the whole for 2 hours under reflux, the cooled reaction mixture is taken up in ether and the solution washed with 2 N-sodium carbonate solution and then with water. After drying over magnesium sulfate and evaporation, the ethereal solution yields 17 grams of N-(γ-phenoxypropyl)-N'-acetyl-1:5-diazacyclo-octane of the formula

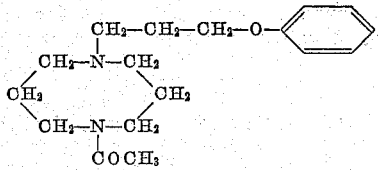

as a viscous, odourless oil.

This base is dissolved in 100 cc. of acetone and after adding an excess of methyl bromide (15 cc.) the whole is allowed to stand overnight at 0° C. The crystalline precipitate is suction-filtered (17 grams; melting point: 234–235° C.) and recrystallized from a mixture of isopropanol and acetone. There is obtained N-methyl-N-(γ - phenoxypropyl)-N'-acetyl-1:5-diazacyclo-octanonium bromide of the formula

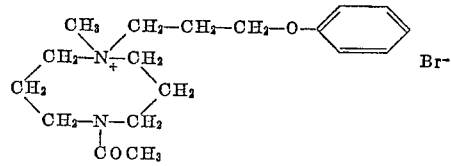

melting at 236–237° C.

What is claimed is:

1. A process as claimed in claim 10, wherein amalgamated aluminum and water are used as the nascent hydrogen source.

2. A process as claimed in claim 10, wherein lithium aluminum hydride is used as the nascent hydrogen source.

3. A process which comprises treating 1:2-trimethylene-pyrazolidine with trimethylenebromhydrin and reducing the resulting 1-(γ-hydroxypropyl)-1:2-trimethylene-pyrazolidinium bromide with nascent hydrogen to 1-(γ-hydroxypropyl)-1:5-diazacyclo-octane.

4. A process which comprises treating 1:2-trimethylene-pyrazolidine with γ-phenoxypropyl bromide and reducing the resulting 1-(γ-phenoxypropyl)-1:2-trimethylene-pyrazolidinium bromide with nascent hydrogen to 1-(γ-phenoxypropyl)-1:5-diazacyclo-octane.

5. Compounds of the formula

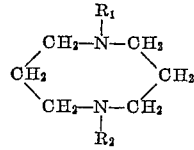

wherein $R_1$ is ω-hydroxy alkyl in which the alkyl group has one to twelve carbon atoms and $R_2$ hydrogen.

6. Compounds of the formula

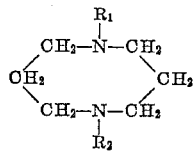

wherein $R_1$ is methyl and $R_2$ ω-hydroxyalkyl in which the alkyl group has one to twelve carbon atoms.

7. Compounds of the formula

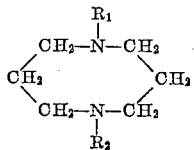

wherein $R_1$ is alkyl having one to twelve carbon atoms and $R_2$ acetyl.

8. 1-alkyl-1:2-trimethylene - pyrazolidinium halide in which the alkyl group has one to twelve carbon atoms.

9. 1-ω-hydroxyalkyl - 1:2 - trimethylene-pyrazolidinium halide in which the alkyl group has one to twelve carbon atoms.

10. Process for the manufacture of 1:5-diazacyclo-octane compounds which comprises treating 1:2-trimethylene-pyrazolidine with a quaternizing reagent of the formula:

$$R_1\text{—}X$$

in which $R_1$ represents an organic radical selected from the group consisting of ω-hydroxyalkyl, ω-alkoxyalkyl, alkyl, ω-phenoxyalkyl, benzyl, diphenylmethyl, mono-halogenoalkyl, ω-diethylaminoalkyl, the alkyl group in each instance having one to twelve carbon atoms and X stands for halogen, and reacitng a resulting quaternary ammonium compound of the formula:

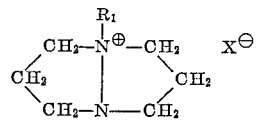

with nascent hydrogen.

11. Process according to claim 10, which comprises using an alkyl halide in which the alkyl group has one to twelve carbon atoms as the quaternizing reagent.

12. Process according to claim 10, which comprises using a hydroxy-alkyl halide in which the alkyl group has one to twelve carbon atoms as the quaternizing reagent.

13. Process according to claim 10, which comprises using phenoxy-alkyl halide the alkyl group of which has one to twelve carbon atoms as the quaternizing reagent.

14. A member of the group consisting of compounds of the formula:

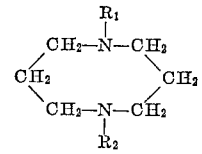

in which $R_1$ represents a member of the group consisting of ω-hydroxyalkyl, ω-alkoxyalkyl, ω-phenoxyalkyl, monohalogenoalkyl, ω-dimethylaminoalkyl, the alkyl group in each instance having one to twelve carbon atoms, and $R_2$ stands for a member of the group consisting of $R_1$, hydrogen, acetyl, alkyl having one to twelve carbon atoms, benzyl and diphenylmethyl, pharmaceutically acceptable acid addition salts thereof, 1-lower alkyl-quaternary ammonium halides thereof and N-oxides thereof.

15. 1-ω-alkoxy-alkyl-1:2-trimethylene - pyrazolidinium halide the alkyl group in each instance having one to twelve carbon atoms.

16. 1-(γ-hydroxypropyl)-1:5-diazacyclo-octane.

17. 1-(γ-phenoxypropyl)-1:5-diazacyclo-octane.

18. 1-(γ-bromopropyl)-1:5-diazacyclo-octane.

19. 5-(diphenylmethyl)-1:5-diazacyclo-octane.

20. Process for the manufacture of 1:5-diazacyclo-octane compounds, which comprises treating 1:2-trimethylene-pyrazolidine with a quaternizing agent of the formula:

$$R_1\text{—}X$$

in which $R_1$ represents a member selected from the group consisting of alkyl, ω-hydroxyalkyl, ω-alkoxyalkyl, ω-phenoxyalkyl, benzyl, diphenylmethyl, mono-halogenoalkyl and ω-diethylaminoalkyl, the alkyl radical in each instance having one to twelve carbon atoms, and in which X stands for halogen, reducing the resulting quaternary ammonium compound of the formula:

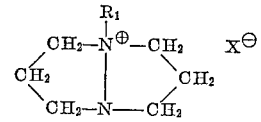

with nascent hydrogen and treating the resulting diazacyclo-octane of the formula:

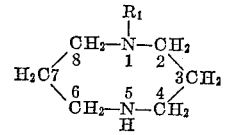

with a member selected from the group consisting of $R_1X$, alkyl—X and $CH_3COX$, alkyl having 1 to 12 carbon atoms and X being halogen.

(References on following page)

References Cited in the file of this patent

Buhle et al.: Journal of American Chemical Society, Volume 65, pages 29–32 (1943).

McElvain: J. Am. Chem. Soc., Volume 76, pages 1126 to 1137 (1954).

Chemical Abstracts, Volume 49, page 3034, 1955, abstracting Nazarov et al., Zhur. Obschchei Khim, Volume 24, pages 163–69 (1954).

Chemical Abstracts, Volume 49, page 3034 (1955) abstracting Nazarov et al.

Chemical Abstracts, Volume 53, page 3234 (1959) abstracting Sasaki.